United States Patent
Hikosaka et al.

(10) Patent No.: US 7,166,376 B2
(45) Date of Patent: Jan. 23, 2007

(54) MAGNETIC RECORDING MEDIUM INCLUDING A HIGH-MAGNETOSTRICTION LAYER AND MAGNETIC RECORDING/REPRODUCING APPARATUS

(75) Inventors: Takashi Hikosaka, Tokyo (JP); Futoshi Nakamura, Ichikawa (JP); Soichi Oikawa, Chiba (JP); Takeshi Iwasaki, Funabashi (JP); Tomoyuki Maeda, Funabashi (JP); Hiroshi Sakai, Ichihara (JP); Kenji Shimizu, Ichihara (JP); Akira Sakawaki, Ichihara (JP)

(73) Assignees: Showa Denko K.K., Tokyo (JP); Kabushiki Kaisha Toshiba, Tokyo (JP)

(*) Notice: Subject to any disclaimer, the term of this patent is extended or adjusted under 35 U.S.C. 154(b) by 335 days.

(21) Appl. No.: 10/786,611

(22) Filed: Feb. 26, 2004

(65) Prior Publication Data

US 2004/0224184 A1  Nov. 11, 2004

(30) Foreign Application Priority Data

Feb. 28, 2003 (JP) ............................ 2003-053818

(51) Int. Cl.
*G11B 5/66* (2006.01)

(52) U.S. Cl. .................. 428/829; 428/831; 428/832

(58) Field of Classification Search .................. None
See application file for complete search history.

(56) References Cited

U.S. PATENT DOCUMENTS

| | | | |
|---|---|---|---|
| 6,054,226 A | 4/2000 | Takeda et al. | |
| 6,127,045 A | 10/2000 | Gill | |
| 6,183,893 B1 | 2/2001 | Futamoto et al. | |
| 6,279,406 B1 | 8/2001 | Li et al. | |
| 6,387,476 B1* | 5/2002 | Iwasaki et al. | 428/212 |
| 6,440,589 B1* | 8/2002 | Fullerton et al. | 428/826 |
| 6,468,670 B1* | 10/2002 | Ikeda et al. | 428/611 |
| 6,913,837 B2* | 7/2005 | Sakai et al. | 428/611 |
| 2002/0018917 A1* | 2/2002 | Sakai et al. | 428/694 TM |
| 2002/0025452 A1 | 2/2002 | Chang et al. | |
| 2006/0028752 A1* | 2/2006 | Tomiyama et al. | 360/60 |

FOREIGN PATENT DOCUMENTS

| | | |
|---|---|---|
| DE | 4004540 A1 | 8/1991 |
| JP | 1-155520 A | 6/1989 |
| JP | 10-23307 A | 9/1998 |

OTHER PUBLICATIONS

Danish Search Report dated Dec. 1, 2004 for Appln. No. SG200401028-6.

* cited by examiner

*Primary Examiner*—Kevin M. Bernatz
(74) *Attorney, Agent, or Firm*—Pillsbury Winthrop Shaw Pittman, LLP

(57) ABSTRACT

A multi-layer including a magnetic recording layer and a high-magnetostriction layer having a magnetostriction constant larger than that of the magnetic recording layer is formed.

15 Claims, 6 Drawing Sheets

MAGNETIC RECORDING MEDIUM INCLUDING A HIGH-MAGNETOSTRICTION LAYER AND MAGNETIC RECORDING/REPRODUCING APPARATUS

CROSS-REFERENCE TO RELATED APPLICATIONS

This application is based upon and claims the benefit of priority from prior Japanese Patent Application No. 2003-053818, filed Feb. 28, 2003, the entire contents of which are incorporated herein by reference.

BACKGROUND OF THE INVENTION

1. Field of the Invention

The present invention relates to a magnetic recording medium for use in, e.g., a hard disk drive using the magnetic recording technique, and a magnetic recording/reproducing apparatus using the magnetic recording medium.

2. Description of the Related Art

The recording density of a hard disk drive (HDD) as one type of a magnetic recording/reproducing apparatus is increasing by 60% or more per year, and this tendency presumably continues in the future. Therefore, a magnetic recording head and magnetic recording medium meeting this high recording density are being developed.

A magnetic recording medium contained in a magnetic recording/reproducing apparatus presently put on the market has a structure in which a Co alloy film containing Co as a main component is formed on an Al alloy substrate or glass substrate by sputtering. Since the longitudinal magnetization system is used as a magnetic recording system, an underlayer for orienting the easy axis of magnetization, i.e., the C axis of Co crystal grains having the hcp structure parallel to the substrate is used. An example of this underlayer is a Cr alloy film in which a specific face of the fcc structure is oriented. In addition, a seed layer, e.g., an NiAl seed layer, for decreasing the grain size by growing a specific face of Cr is used. A measure to counter the problem that the holding period of recorded information shortens by thermal decay as the recording density increases is demanded. Therefore, a longitudinal magnetic recording medium is developed in which multiple layers are antiferro-magnetically coupled with each other by a multilayered structure formed by sandwiching a thin Ru film between magnetic films.

Also, as a method more suited to high density, a perpendicular magnetic recording system using perpendicular magnetization in recording is being extensively studied. In this system, the same Co alloy as used in the longitudinal medium is used as a recording layer. However, to perpendicularly orient the C axes of Co crystal grains, amorphous such as Ge or NiTa or an underlayer such as Ti, Ru, Pd, or Pt in which the closest packed plane of hcp or fcc is oriented is used. In addition, to ensure a perpendicular write magnetic field, a soft magnetic layer is formed between the substrate and the underlayer and seed layer and combined with a single pole head, thereby obtaining better perpendicular recording.

To reduce the noise of the perpendicular magnetic recording medium, Jpn. Pat. Appln. KOKAI Publication No. 11-296833, for example, proposes a method by which a double-layered perpendicular magnetic recording layer is used, and the content of a nonmagnetic element in the upper layer is made smaller than that in the lower layer, thereby making the saturation magnetization and magnetic anisotropic energy in the upper layer larger than those in the lower layer.

Furthermore, techniques of controlling thermal decay of the perpendicular magnetic recording medium are also disclosed. Examples currently being studied are a method of forming a Pt film on the surface of a recording layer, and a CGC (Continuous Granular Composite) medium in which a film having a strong magnetic interaction in the film is formed on a CoCrPt-based magnetic film.

To increase the recording/reproduction resolution, it is known to, e.g., shorten the shield gap length of an MR head, reduce the space between the head and the magnetic recording medium, decrease the film thickness in the longitudinal magnetic recording medium, decrease the distance between the head and the backing soft magnetic film in the perpendicular magnetic recording medium, or reduce the coercive force dispersion.

Unfortunately, the conventional magnetic recording media and recording/reproducing apparatuses are unsatisfactory in performance for the purpose of high-density recording, and require further improvements.

As described above, reducing the coercive force dispersion or the like of the magnetic recording medium is presumably advantageous to increase the recording resolution. However, no method capable of further reducing the coercive force dispersion of the current magnetic recording media has been found yet.

BRIEF SUMMARY OF THE INVENTION

First, the present invention provides a magnetic recording medium comprising, on a substrate, a multi-layer including a magnetic recording layer and a high-magnetostriction layer having magnetostriction larger than that of the magnetic recording layer.

Second, the present invention provides a magnetic recording apparatus characterized by comprising a recording medium which comprises, on a substrate, a multi-layer including a magnetic recording layer and a high-magnetostriction layer having magnetostriction larger than that of the magnetic recording layer, and a recording/reproducing head.

BRIEF DESCRIPTION OF THE SEVERAL VIEWS OF THE DRAWING

The accompanying drawings, which are incorporated in and constitute a part of the specification, illustrate embodiments of the invention and, together with the general description given above and the detailed description of the embodiments given below, serve to explain the principles of the invention.

DETAILED DESCRIPTION OF THE INVENTION

A magnetic recording medium of the present invention comprises, on a substrate, a multi-layer including a magnetic recording layer and a high-magnetostriction layer having magnetostriction larger than that of the magnetic recording layer.

The magnetic recording layer is a magnetic layer having large magnetic anisotropy capable of recording information. In the present invention, the high-magnetostriction layer is a magnetic layer having magnetostriction larger than that of the magnetic recording layer.

In the present invention, when a magnetic field is applied during information recording, deformations appear in the high-magnetostriction layer, and this produces deformations in the magnetic recording layer. The inverse magnetostriction effect decreases the anisotropy of the magnetic recording layer to allow easy magnetization reversal. The larger the head magnetic field during recording, the larger the magnetostriction, and the smaller the anisotropy. Consequently, the magnetization curve of the medium substantially becomes steep to achieve the same effect as when the anisotropic dispersion decreases. This makes the magnetization transition region short and steep. Since the coercive force dispersion substantially decreases and this decreases the magnetization transition width, the recording resolution increases. Also, the magnetization transition length decreases to make an anisotropic magnetic field Hk uniform, so the medium S/N ratio increases Furthermore, when the head magnetic field is removed after recording, the magnetostriction disappears, and this removes the deformations in the recording layer. This prevents the magnetic anisotropy from changing in such a direction as to increase, so the thermal decay resistance does not lower.

A magnetic recording/reproducing apparatus of the present invention has the magnetic recording medium described above and a recording/reproducing head.

When a perpendicular magnetic recording system is applied, a single pole head can be used as the recording/reproducing head.

The present invention will be described in more detail below with reference to the accompanying drawing.

Figure 1:
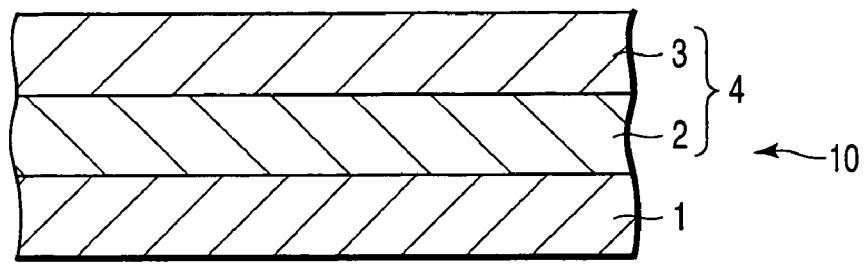
FIG. 1 is a schematic sectional view showing the arrangement of the first example of a magnetic recording medium of the present invention.

FIG. 1 is a schematic sectional view showing the arrangement of the first example of the magnetic recording medium of the present invention.

As shown in FIG. 1, a magnetic recording medium 10 comprises a substrate 1 made of, e.g., crystallized glass, and a multi-layer 4 including a magnetic recording layer 2 and a high-magnetostriction layer 3 made of, e.g., $Sm_{0.5}Dy_{0.5}Fe_2$, formed in this order on the substrate 1.

The high-magnetostriction layer 3 in the multi-layer 4 can be formed in a position where strain of the high-magnetostriction layer 3 has influence on the magnetic recording layer 2. Referring to FIG. 1, the substrate, magnetic recording layer, and high-magnetostriction layer are stacked in this order. However, it is also possible to stack the high-magnetostriction layer and magnetic recording layer in this order on the substrate. Furthermore, an interlayer can also be formed between the magnetic recording layer and high-magnetostriction layer. Alternatively, a high-magnetostriction layer can be formed in at least one portion between two or more magnetic recording layers. This structure is particularly effective when no sufficient strain can be easily given to the magnetic recording layer because the layer is thick or has a high Young's modulus.

Figure 2:
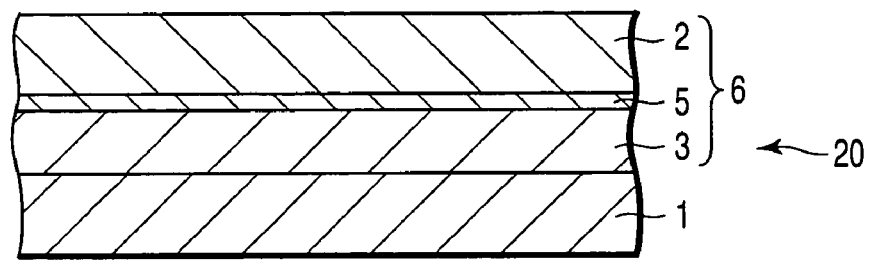
FIG. 2 is a schematic sectional view showing the arrangement of the second example of the magnetic recording medium of the present invention.

FIG. 2 is a schematic sectional view showing the arrangement of the second example of the magnetic recording medium of the present invention. A magnetic recording medium 20 shown in FIG. 2 has the same structure as shown in FIG. 1 except that a multi-layer 6 is formed instead of the multi-layer 4. In the multi-layer 6, a magnetic recording layer 2 is formed on a high-magnetostriction layer 3 via an interlayer such as an underlayer 5.

For example in one embodiment, the high-magnetostriction layer may have a saturation magnetic field larger than the coercive force of the magnetic recording layer, and moreover in another embodiment the high-magnetostriction layer has a saturation magnetic field larger than that of the magnetic recording layer. If the saturation magnetic field of the high-magnetostriction layer is smaller than the coercive force of the magnetic recording layer, the deformations of the high-magnetostriction layer caused by the magnetostriction stops at the same time the magnetic field saturates even when the head magnetic field is made larger than the saturation magnetic field of the high-magnetostriction layer. Consequently, no large inverse magnetostriction effect can be obtained, and this tends to result in an insufficient increase in recording resolution and medium S/N ratio.

The high-magnetostriction layer can be a single high-magnetostriction film having high magnetostriction or a multi-layer of the high-magnetostriction film and another film having other characteristics.

For example, when the saturation magnetic field of the high-magnetostriction layer is smaller than the coercive force of the magnetic recording layer, the saturation magnetic field of the high-magnetostriction layer can be made larger than the coercive force of the magnetic recording layer by using a multi-layer including a high-magnetostriction film and a film whose anisotropic magnetic field is larger than the coercive forces of the high-magnetostriction film and magnetic recording layer. In this structure, even when a head magnetic field larger than the coercive force of the magnetic recording layer is applied, the deformation of the high-magnetostriction layer caused by the magnetostriction does not stop, so a large inverse magnetostriction effect can be obtained.

The same effect can also be obtained by using a multilayer including a high-magnetostriction film and a film having large forced magnetostriction which appears when spins are forcedly oriented by an external magnetic field larger than the saturation magnetic field.

The above example uses characteristics which decrease the magnetic anisotropy by magnetostriction when a magnetic field is applied. However, this example can also be used to increase the thermal decay resistance by increasing the magnetic anisotropy of the recording layer by magnetostriction when a magnetic field is applied.

Figure 3:
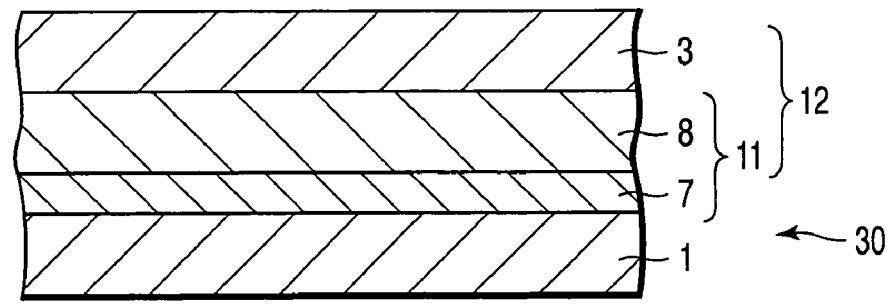
FIG. 3 is a schematic sectional view showing the arrangement of the third example of the magnetic recording medium of the present invention.

FIG. 3 is a schematic sectional view showing the third example of the magnetic recording medium of the present invention.

As shown in FIG. 3, a magnetic recording medium 30 has the same structure as shown in FIG. 1 except that a multi-layer 12 is formed instead of the multi-layer 4. The multi-layer 12 includes a double-layered high-magnetostriction layer 11 having a film 7 whose anisotropic magnetic field is larger than that of a high-magnetostriction film and a high-magnetostriction film 8 formed in this order on a substrate 1, and a magnetic recording layer 3 formed on the high-magnetostriction film 11.

It is also possible to form a film having large forced magnetostriction in place of the film 7 whose anisotropic magnetic field is larger than that of the high-magnetostriction film.

The high-magnetostriction film has a large magnetostriction constant of preferably $5 \times 10^{-5}$ or more, more preferably $5 \times 10^{-5}$ to $4 \times 10^{-4}$, and most preferably $1 \times 10^{-4}$ to $4 \times 10^{-4}$, in the magnetic field application direction. When this magnetostriction constant is $5 \times 10^{-5}$, a sufficient strain can be given to the magnetic recording layer, so it is possible to further reduce the anisotropic dispersion and effectively improve the medium characteristics.

The magnetic recording layer has a Young's modulus of preferably $10^{12}$ to $10^{10}$ (N/m$^2$), and more preferably $10^{11}$ (N/m$^2$). In practice, a high-magnetostriction material can be selected in accordance with the magnetic characteristics of the magnetic recording layer.

When a magnetic recording layer having the Young's modulus and magnetostriction constant as described above is used, strain is readily produced by the influence of the high-magnetostriction layer, so the magnetic anisotropy decreases more effectively by the inverse magnetostriction effect. The change in magnetic anisotropy by the inverse magnetostriction effect is not large when compared with the magnitude of the crystallomagnetic anisotropy of a Co alloy. However, this change is not negligibly small when compared with the magnitude of magnetic anisotropy dispersion, and can have a favorable effect on the coercive force dispersion.

Also, the change in magnetic anisotropy by the inverse magnetostriction effect cannot be ignored when compared with the value of Hn representing the reverse magnetic domain generating magnetic field of the recording layer. Accordingly, the thermal decay resistance can also be increased.

For instance, in some embodiments, as the magnetic recording layer, a perpendicular magnetic recording layer can be used.

This perpendicular magnetic recording layer can have either a single-layered structure or multilayered structure. When a multilayered structure is used, the manufacturing process is complicated, but various characteristics required of the perpendicular magnetic recording layer can be controlled relatively easily. Examples of the characteristics required of the perpendicular magnetic recording layer are that the perpendicular direction is the easy axis of magnetization, the layer has magnetic anisotropy and alignment with which data can be well written by the recording head magnetic field, recording bits are stable at both high density and low density although the magnetization unit is fine and noise is low, and no magnetization reversal occurs due to an unnecessary external magnetic field or adjacent recording.

For example, as the perpendicular magnetic recording layer, in one embodiment, a hexagonal closest packed (hcp) Co alloy can be used. When a Co alloy having this hcp structure is stretched in the direction of the easy axis of magnetization, the c/a axis ratio of crystal increases, so the magnetic anisotropy can be decreased. Therefore, as a high-magnetostriction film used in the perpendicular magnetic recording medium, it is possible to use a film having positive magnetostriction in the magnetic field direction and negative magnetostriction in a direction perpendicular to the magnetic field. Accordingly, when a perpendicular magnetic field appears, this high-magnetostriction film expands in a direction perpendicular to the surface of the substrate, and contracts in the direction of the surface of the substrate. Especially when a hexagonal closest packed (hcp) magnetic film such as Co alloy film is used as the magnetic recording layer, if the direction of the easy axis of magnetization and the magnetic field application direction are the same, no magnetostriction is generated by this Co alloy-based magnetic film alone, so the high-magnetostriction material can function more effectively.

Even when a longitudinal magnetic recording layer is used, the head magnetic field is applied in the horizontal direction because a ring head is used. Therefore, a high-magnetostriction material having a positive magnetostriction constant in a direction parallel to the film surface can be combined with a longitudinally oriented Co alloy film.

As this high-magnetostriction film material, it is possible to use, e.g., RFe$_2$-based materials such as Sm$_{0.5}$Dy$_{0.5}$Fe$_2$, Tb$_x$Dy$_{1-x}$Fe$_2$, TbFe$_2$ (oriented in [111]), and ErFe$_2$, Fe$_3$Pt, an Fe/Pt stacked film, an Fe/Pd stacked film, an FeAl alloy, a rare earth element-containing Co alloy, and a ferrite-based material. The magnetostriction of any of these magnetostriction materials can be increased by orientation. Also, when nitrogen or oxygen is added to these magnetostriction materials, noise from the high-magnetostriction layer can be reduced.

Examples of a cobalt alloy usable as the magnetic recording layer material are CoCrPt, CoCrPtB, CoCrPtC, CoCrPtTa, CoCrPtCu, CoCrPtRu, CoCrPtCuB, CoCrPtRuB, CoCrPtTaNd, CoCrPtWC, CoCrPtO, CoPtO, CoPt—SiO$_2$, CoCrPt—SiO$_2$, CoPtO—SiO$_2$, and CoPtCrO—SiO$_2$. It is also possible to use, e.g., a Co/Pd stacked layer, Co/Pt stacked layer, and FePt.

For example, it is possible to use a Co alloy as a main element, add Pt to increase the anisotropy, weaken the magnetic interaction between grains to make the magnetic unit fine, and add Cr, oxygen, or SiO$_2$ to make high-density recording feasible. When the magnetic recording layer is formed, Cr readily segregates in the crystal grain boundary by substrate heating or the like. Accordingly, the magnetic recording layer can take a favorable structure in which the Co alloy crystal in which the C axis of hpc is aligned perpendicularly to the substrate is magnetically separated and made fine by Cr. Even when oxygen or SiO$_2$ is added, a Co oxide, Cr oxide, or SiO$_2$ segregates in the grain boundary to make this grain boundary portion nonmagnetic, so oxygen or SiO$_2$ also functions in the same manner as Cr.

When oxygen is used, the grain size can be further decreased without any substrate heating.

An underlayer can be formed to form the magnetic recording layer.

As this underlayer by which the crystal anisotropy of the crystal grains of the magnetic recording layer can be oriented in the perpendicular direction, it is possible to preferably use a material, such as a nonmagnetic CoCr-based material in Ru-based material, which takes the hcp structure or fcc structure, in which the closest packed face readily grows parallel to the substrate, and which has a lattice constant close to that of the recording layer.

Also, a seed layer can be formed before the underlayer is formed. Examples of the seed layer for the underlayer capable of orienting the crystal anisotropy in the perpendicular direction are Ti, Pt, Pd, Au, NiAl, Hf, Ru, Ge, NiTa, CoNiTa, NiNb, CoNiNb, Ag, Al, Si, and C.

At a position separated from a recording track, the head magnetic field is applied in a direction different from the track position. Therefore, the high-magnetostriction layer so acts as to increase the anisotropy of the magnetic recording layer. In this manner, the head magnetic field effectively functions against the problem that information on an adjacent track is erased during recording.

Examples of the underlayer capable of orienting the crystal anisotropy of the crystal grains in the magnetic recording layer in the longitudinal direction are Cr, CrV, CrNb, CrMo, CrW, CrB, CrCu, V, VCr, Nb, NbCr, and NbV. As the seed layer, it is possible to use NiAl, FeAl, TiN, MgO, Ag, Al, and C.

When a perpendicular magnetic recording layer is to be formed as the magnetic recording layer, a soft magnetic layer can be formed between this perpendicular magnetic recording layer and the substrate.

When a soft magnetic layer having high magnetic permeability is formed, a so-called double-layered perpendicular medium having a perpendicular magnetic recording layer on this soft magnetic layer is obtained. In this double-layered perpendicular medium, the soft magnetic layer performs part of the function of a magnetic head, i.e., horizontally passes the recording magnetic field from a magnetic head, e.g., a single pole head for magnetizing the perpendicular magnetic recording layer, and returns the recording magnetic field to the magnetic head. That is, the soft magnetic field applies a steep sufficient perpendicular magnetic field to the magnetic recording layer, thereby increasing the recording/reproduction efficiency.

As the soft magnetic material, it is possible to use CoZrNb, FeCoB, FeCoN, FeTaC, FeTaN, FeNi, and FeAlSi, each of which has a high saturation magnetic flux density and favorable soft magnetic characteristics.

In addition, a bias application layer such as a longitudinal hard magnetic film or antiferromagnetic film can be formed between the soft magnetic layer and substrate. The soft magnetic layer readily forms a magnetic domain, and this magnetic domain generates spike noise. The generation of a magnetic wall can be prevented by applying a magnetic field in one direction of the radial direction of the bias application layer, thereby applying a bias magnetic field to the soft magnetic layer formed on the bias application layer. It is also possible to give the bias application layer a stacked structure to finely disperse the anisotropy and make a large magnetic domain difficult to form.

Examples of the bias application layer material are CoCrPt, CoCrPtB, CoCrPtTa, CoCrPtC, CoCrPtCuB, CoCrRuB, CoCrPtWC, CoCrPtWB, CoCrPtTaNd, CoSm, CoPt, CoPtO, CoCrPtO, CoPt—$SiO_2$, and CoCrPtO—$SiO_2$.

Figure 4:
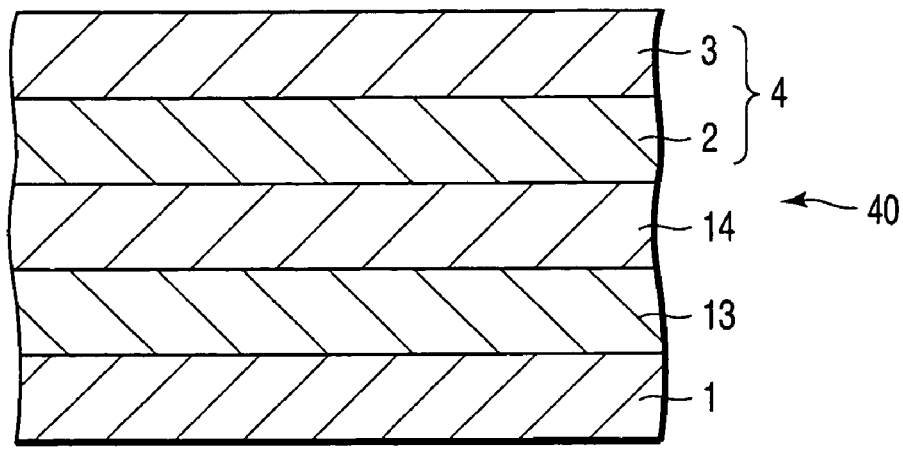
FIG. 4 is a schematic sectional view showing the arrangement of the fourth example of the magnetic recording medium of the present invention.

FIG. 4 is a schematic sectional view showing the arrangement of the fourth example of the magnetic recording medium of the present invention.

As shown in FIG. 4, a magnetic recording medium 40 has the same structure as shown in FIG. 1 except that between a substrate 1 and a multi-layer 4 having a magnetic recording layer 2 and high-magnetostriction layer 3, a bias application layer 13 and soft magnetic layer 14 are formed in this order from the substrate 1.

In addition, a low-elasticity layer having a Young's modulus lower than that of the soft magnetic layer can also be formed between the soft magnetic layer and multi-layer.

This low-elasticity layer is selected in accordance with the material of the soft magnetic layer. For example, it is possible to use a low-melting material such as tin, lead, indium, or bismuth, or a polymer material such as polyester or polyimide.

Figure 5:
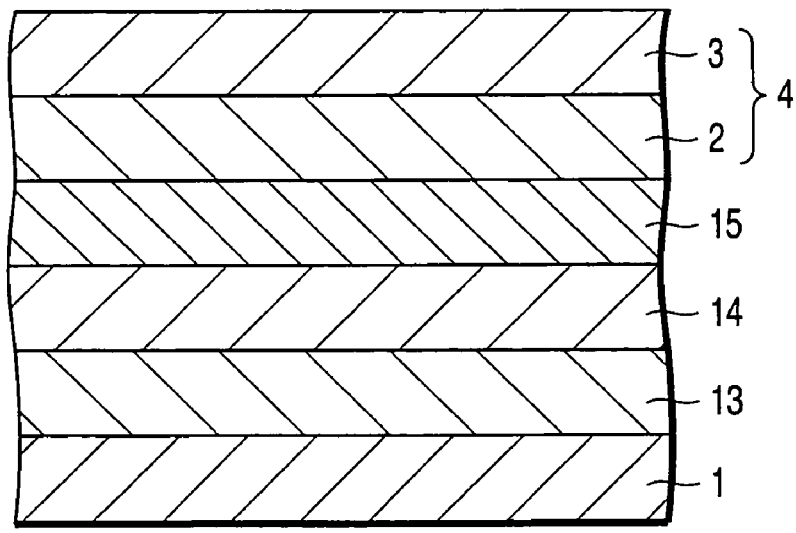
FIG. 5 is a schematic sectional view showing the arrangement of the fifth example of the magnetic recording medium of the present invention.

FIG. 5 is a schematic sectional view showing the arrangement of the fifth example of the magnetic recording medium of the present invention.

As shown in FIG. 5, a magnetic recording medium 50 has the same structure as shown in FIG. 4 except that a low-elasticity layer 15 is formed between a multi-layer 4 and soft magnetic layer 14.

Referring to FIG. 4, a nonmagnetic underlayer (not shown) for improving the perpendicular orientation of the magnetic recording layer can also be formed on the soft magnetic layer 14. This underlayer also has a function of causing magnetic separation between the recording layer and soft magnetic layer, thereby preventing degradation of the characteristics of the soft magnetic layer. As the underlayer, for example, in some embodiments, it is possible to use a material, such as a nonmagnetic CoCr-based material or Ru-based material, which takes the hcp structure or fcc structure, in which the closest packed face readily grows longitudinal to the substrate, and which has a lattice constant close to that of the recording layer. This underlayer can be a single layer or two or more multi-layers in order to control the grain size or improve the orientation even when the thickness is small.

Figure 6:
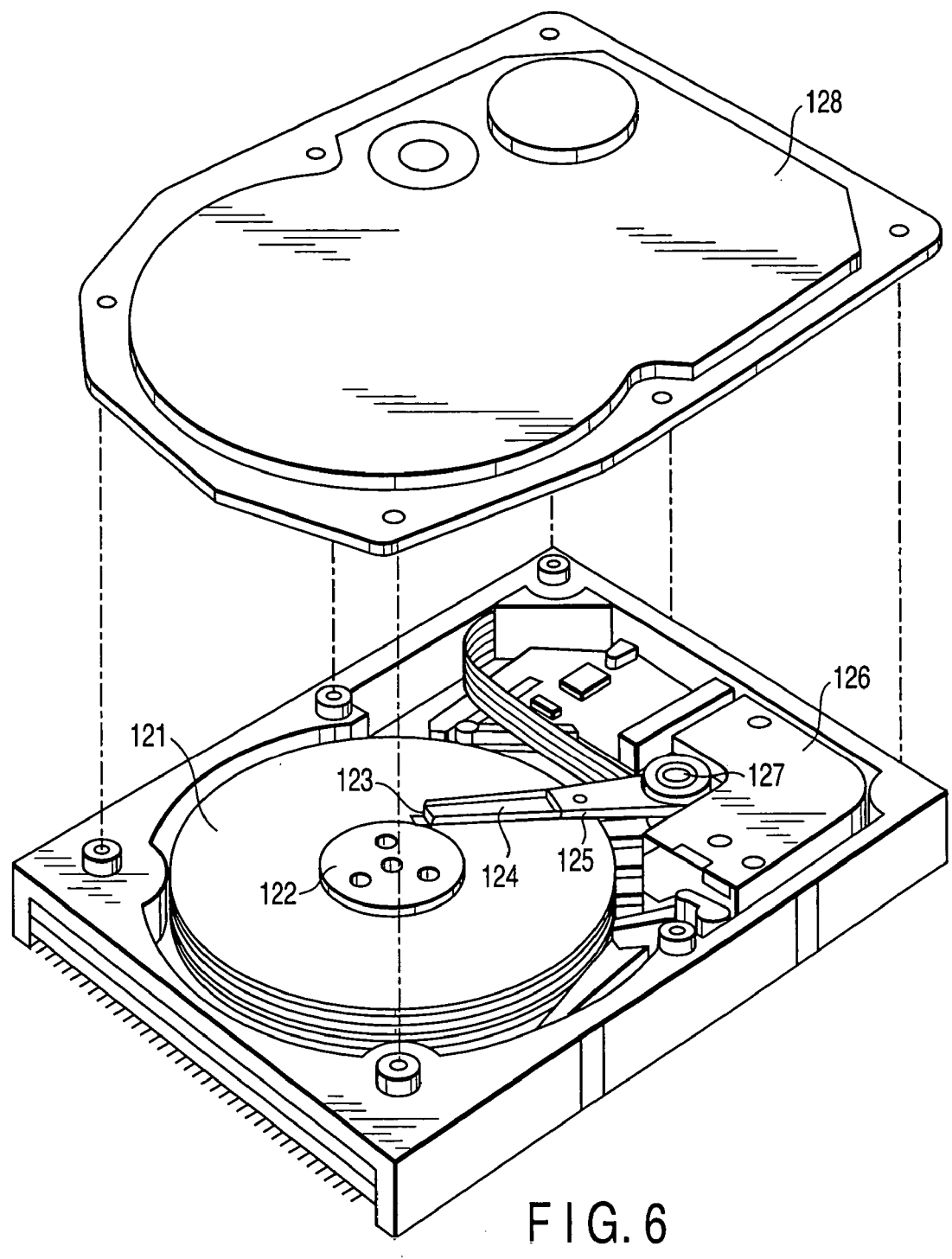
FIG. 6 is a perspective view showing the arrangement of an example of a magnetic recording/reproducing apparatus of the present invention.

FIG. 6 is a partially exploded perspective view showing an example of the magnetic recording/reproducing apparatus of the present invention.

A rigid magnetic disk 121 for recording information according to the present invention is fitted on a spindle 122 and rotated at a predetermined rotational speed by a spindle motor (not shown). A slider 123 mounting a single pole recording head for accessing the magnetic disk 121 to record information and an MR head for reproducing information is attached to the end portion of a suspension 124 which is a thin leaf spring. The suspension 124 is connected to one end of an arm 125 having, e.g., a bobbin which holds a driving coil (not shown).

A voice coil motor 126 as a kind of a linear motor is attached to the other end of the arm 125. This voice coil motor 126 includes the driving coil (not shown) wound around the bobbin of the arm 125, and a magnetic circuit having a permanent magnetic and counter yoke opposing each other on the two sides of the driving coil.

The arm 125 is held by ball bearings (not shown) formed in two, upper and lower portions of a fixed shaft 127, and pivoted by the voice coil motor 126. That is, the position of the slider 123 on the magnetic disk 121 is controlled by the voice coil motor 126. Reference numeral 128 in FIG. 6 denotes a lid.

Embodiments

Embodiment 1

A 2.5-inch, hard-disk-like crystallized glass substrate was placed in a sputtering apparatus, and the apparatus was evacuated to $1\times10^{-5}$ Pa or less. After that, the substrate was heated at 1,700 W for 7 sec, and sputtering was performed at an Ar pressure of 0.6 Pa by using an Ni-50 at % Al target, thereby forming a 5-nm thick NiAl film as a seed layer.

Subsequently, a 5-nm thick Cr alloy underlayer for orienting a hard magnetic film in the longitudinal direction was formed on the NiAl film. On this Cr alloy underlayer, a 15-nm thick Co-19 at % Cr-14 at % Pt-1 at % Cu-1 at % B hard magnetic film for applying a bias magnetic field to a soft magnetic film was formed.

In addition, on the thus obtained hard magnetic film, a 2-nm thick Co-26 at % Cr-15 at % Ru weak magnetic film was formed to control the magnetization fixing strength between the longitudinal hard magnetic film and a soft magnetic film on it. On this weak magnetic film, a 100-nm thick Co-5 at %-Zr-8 at % Nb film and 20-nm thick Co-6 at % Ta-2 at % Zr film were formed as a soft magnetic layer.

Furthermore, on this soft magnetic layer, a 5-nm thick Ni-40 at % Ta film and a 15-nm thick Co-26 at % Cr-12 at % Pt-4 at % B film having a high Cr composition to function as an initial growth layer of a magnetic recording layer were formed as orientation control layers.

After that, a multi-layer was formed on this film by first forming a 20-nm thick Co-19 at % Cr-16 at % Pt-1 at % B film having a magnetostriction constant of $1\times10^{-5}$ as a perpendicular magnetic recording layer, and then forming a 4-nm thick $Sm_{0.5}Dy_{0.5}Fe_2$ high-magnetostriction film having a magnetostriction constant of $2\times10^{-4}$ larger than that of the magnetic recording layer.

After a 6-nm thick carbon film was formed on this multi-layer by CVD, a perfluoropolyether (PFPE) film having a thickness of 1 nm or more was formed as a lubricating layer by dip coating, thereby obtaining a perpendicular magnetic recording medium A-1.

A pulse magnetic field of 1,185 kA/m (15 kOe) or more was applied to the obtained perpendicular magnetic recording medium A-1 in the radial direction by using a magnetizing apparatus, in order to orient magnetization of the longitudinal hard magnetic film in the radial direction, thereby applying a bias magnetic field to the soft magnetic layer. In this manner, magnetic domains were removed from the soft magnetic film.

Figure 7:
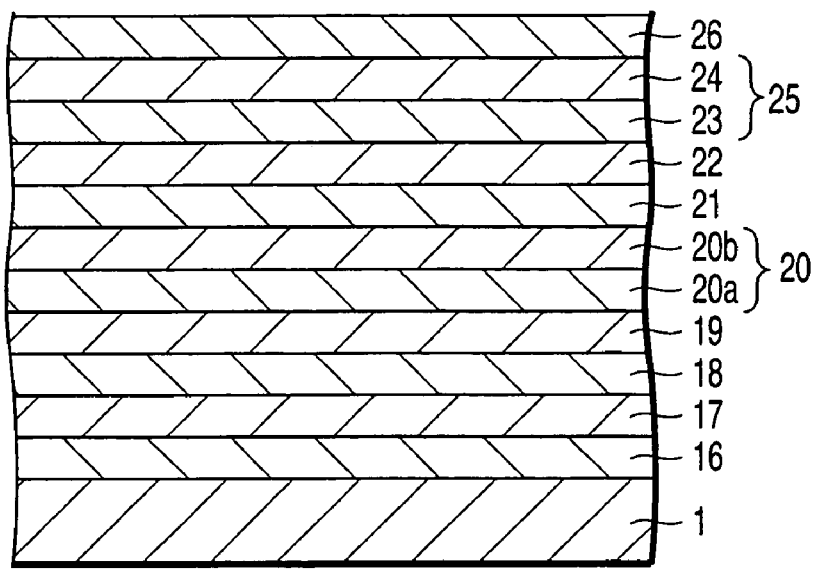
FIG. 7 is a schematic sectional view showing the arrangement of the sixth example of the magnetic recording medium of the present invention.

FIG. 7 shows the arrangement of the obtained medium A-1.

As shown in FIG. 7, the medium A-1 has an arrangement in which a seed layer 16, an underlayer 17, a hard magnetic layer 18, a weak magnetic layer 19, a soft magnetic layer 20 made up of soft magnetic films 20a and 20b, a first orientation control layer 21, a second orientation control layer 22, a multi-layer 25 made up of a perpendicular magnetic recording layer 23 and high-magnetostriction film 24, a carbon layer 26, and a lubricating layer (not shown) are stacked in this order on a substrate 1.

Kerr effect measurement and electromagnetic conversion characteristic evaluation (recording/ reproduction characteristic evaluation) were performed on the obtained medium A-1. The obtained results are shown in Table 1 (to be presented later).

The magnetic characteristics of the medium A-1 evaluated by using the Kerr effect were that the perpendicular coercive force (perpendicular Hc) was 280.45 kA/m (3,550 Oe), a squareness ratio Rs was 0.92, and a reverse magnetic domain generating magnetic field Hn was 63.2 kA/m (800 Oe). As is apparent from the relationship between the perpendicular coercive force and Hn, the slope of the MH loop of the obtained perpendicular magnetic recording medium was steep, indicating high recording resolution.

The recording/reproduction characteristics of the medium A-1 were evaluated by using a head including a 0.25-μm wide single pole recording head and 0.22-μm wide GMR reproducing element and corresponding to a floating amount of 15 nm. As an index of the recording resolution, a half-width PW50 of the waveform obtained by differentiating a solitary reproduction wave was 8.2 nanoseconds, a favorable value. Also, a ratio (medium noise ratio) SNm of noise (rms value) to a low-frequency solitary signal at a recording density of 500 kFCI of a reproduction wave processed by a differentiating circuit was 23.3 dB.

Control 1

For comparison, a perpendicular magnetic recording medium B-1 was manufactured following the same procedures as for the medium A-1 of Embodiment 1 except that no $Sm_{0.5}Dy_{0.5}Fe_2$ film was formed.

Kerr effect measurement and electromagnetic conversion characteristic evaluation (recording/reproduction characteristic evaluation) were performed on the obtained medium B-1 in the same manner as in Embodiment 1. The obtained results are shown in Table 1 (to be presented later).

The characteristics of the medium B-1 were that the perpendicular coercive force was 300.2 kA/m (3,800 Oe), the squareness ratio Rs was 0.90, the reverse magnetic domain generating magnetic field Hn was 23.7 kA/m (300 Oe), the value of PW50 was 9.1 nanoseconds, and the value of SNm was 22.6 dB.

The medium A-1 was superior in recording resolution and SNm to the medium B-1. Also, since the value of Hn of the medium A-1 increased, an output reduction by thermal decay was −0.15%/decade in the medium B-1 but improved to −0.12%/decade in the medium A-1.

Embodiment 2

Following the same procedures as in Embodiment 1, a 5-nm thick Ni-50 at % Al seed film and 5-nm thick Cr-20 at % Mo alloy film were formed on a crystallized glass substrate. In addition, a multi-layer was formed as a longitudinal magnetic recording layer on this alloy film by first forming a 20-nm thick Co-20 at % Cr-16 at % Pt-8 at % B film, and then forming a 4-nm thick $ErFe_2$ high-magnetostriction film having large is magnetostriction.

After that, a carbon film and lubricating layer were formed following the same procedures as in Embodiment 1, thereby obtaining a longitudinal magnetic recording medium A-2.

Figure 8:
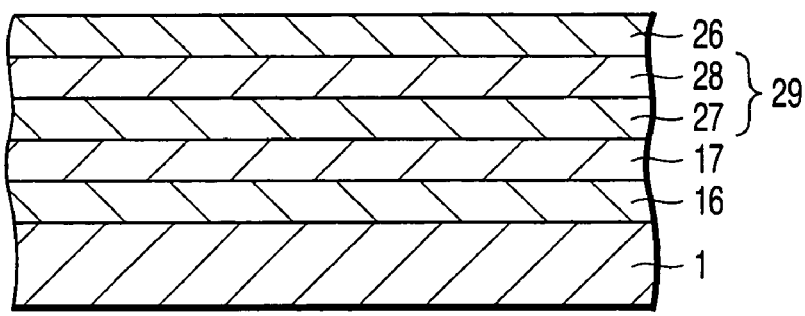
FIG. 8 is a schematic sectional view showing the arrangement of the seventh example of the magnetic recording medium of the present invention.

FIG. 8 is a schematic sectional view showing the arrangement of the obtained longitudinal magnetic recording medium A-2.

As shown in FIG. 8, this longitudinal magnetic recording medium has an arrangement in which a seed layer 16, an underlayer 17, a multi-layer 29 made up of a longitudinal magnetic recording layer 27 and high-magnetostriction layer 28, a carbon protective layer 26, and a lubricating layer (not shown) are stacked in this order on a substrate 1.

Kerr effect measurement and electromagnetic conversion characteristic evaluation (recording/reproduction characteristic evaluation) were performed on the obtained longitudinal magnetic recording medium A-2. The obtained results are shown in Table 2 (to be presented later).

Control 2

For comparison, a longitudinal magnetic recording medium B-2 was obtained following the same procedures as for the medium A-2 except that no $ErFe_2$ high-magnetostriction film was formed.

Kerr effect measurement and electromagnetic conversion characteristic evaluation (recording/reproduction characteristic evaluation) were performed on the obtained longitudinal magnetic recording medium B-2. The obtained results are shown in Table 2 (to be presented later).

The characteristics of the medium A-2 of Embodiment 2 were that the longitudinal coercive force (longitudinal Hc) was 355.5 kA/m (4,500 Oe), a longitudinal squareness ratio S was 0.86, and a coercive force squareness ratio S* was 0.82. As is apparent from the value of S*, the sloop of the MH loop was steep, indicating high recording resolution.

In addition, the recording/reproduction characteristics were evaluated by using a head including a 0.25-μm wide single pole recording head and 0.22-μm wide GMR reproducing element and corresponding to a floating amount of 15 nm. As an index of the recording resolution, the half-width PW50 of a solitary waveform was 9.0 nanoseconds, a favorable value. Also, the value of SNm at a recording density of 500 kFCI was 23.1 dB.

The characteristics of the medium B-2 were that the longitudinal coercive force was 379.2 kA/m (4,800 Oe), the longitudinal squareness ratio was 0.78, the value of PW50 was 9.2 nanoseconds, and the SNm ratio was 22.6 dB.

As described above, the medium A-2 was superior in recording resolution and SNm to the medium B-2.

Embodiment 3

Following the same procedures as in Embodiment 1, a seed layer, underlayer, hard magnetic layer, weak magnetic layer, and soft magnetic layer made up of two soft magnetic films were formed on a substrate. In addition, on the soft magnetic layer, a 5-nm thick tin layer ($E=5\times10^{10}$ N/m$^2$) was formed such that the Young's modulus was smaller than that of a CoZrNb film ($E=1\times10^{11}$ N/m$^2$) so as not to transmit strain to the underlying soft magnetic film. Furthermore, on this tin layer, a 4-nm thick $Sm_{0.5}Dy_{0.5}Fe_2$ high-magnetostriction film ($2\times10^{-4}$) was formed. On this film, a 5-nm thick Ni-40 at % Ta film and 15-nm thick Co-26 at % Cr-12 at % Pt-4 at % B film similar to those of Embodiment 1 were formed as orientation control layers. On these orientation control layers, a 20-nm thick Co-19 at % Cr-16 at % Pt-1 at % B film having a magnetostriction constant of $10^{-5}$ order was formed as a perpendicular recording layer.

Since the tin film having high hardness and a small Young's modulus was formed between the film having a large magnetostriction constant and the soft magnetic film, the influence of magnetostriction was not easily transmitted to the soft magnetic film, so it was possible to reduce changes in characteristics of the soft magnetic film. A carbon film and lubricating layer were formed on the resultant structure following the same procedures as in Embodiment 1, thereby obtaining a perpendicular magnetic recording medium A-3.

After that, a pulse magnetic field was applied to the medium A-3 in the radial direction by using a magnetizing apparatus in the same manner as in Embodiment 1, thereby orienting magnetization of the longitudinal hard magnetic film in the radial direction.

Figure 9:
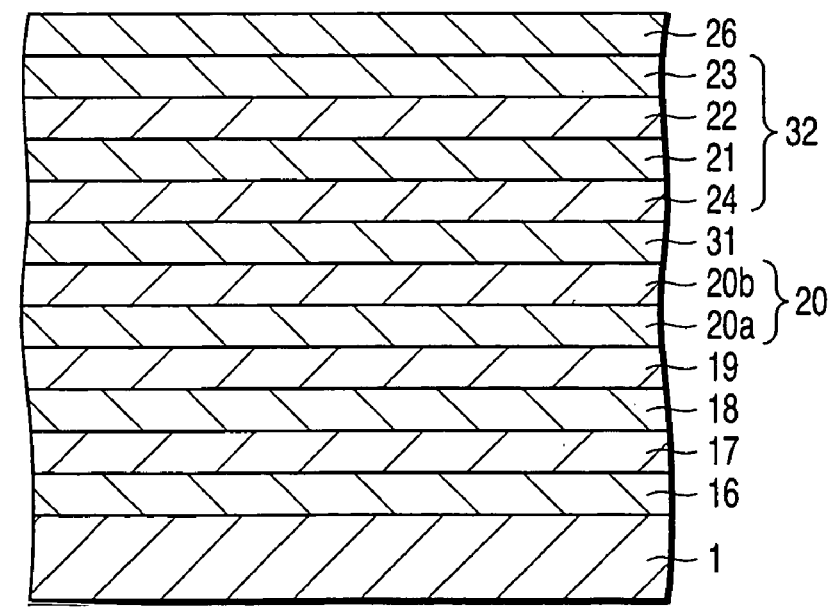
FIG. 9 is a schematic sectional view showing the arrangement of the eighth example of the magnetic recording medium of the present invention.

FIG. 9 is a schematic sectional view showing the arrangement of the medium A-3.

As shown in FIG. 9, the perpendicular magnetic recording medium A-3 has an arrangement in which a seed layer 16, an underlayer 17, a hard magnetic layer 18, a weak magnetic layer 19, a soft magnetic layer 20 made up of soft magnetic films 20a and 20b, a low-elasticity layer 31, a multi-layer 32, and a carbon layer 26 are stacked in this order on a substrate 1. The multi-layer 32 has a high-magnetostriction film 24, first orientation control layer 21, second orientation control layer 22, and perpendicular magnetic recording layer 23 formed in this order on the low-elasticity layer 31.

Kerr effect measurement and electromagnetic conversion characteristic evaluation (recording/reproduction characteristic evaluation) were performed on the obtained medium A-3 in the same manner as in Embodiment 1. The obtained results are shown in Table 1 (to be presented later).

The magnetic characteristics of the medium A-3 were that the perpendicular coercive force was 284.4 kA/m (3,600 Oe), the squareness ratio Rs was 0.91, and the reverse magnetic domain generating magnetic field Hn was 31.6 kA/m (400 Oe). As is apparent from the relationship between the perpendicular Hc and Hn, the slope of the MH loop of the medium A-3 was steep, indicating high recording resolution, compared to the medium B-1 in which neither a high-magnetostriction film nor a low-elasticity film was formed.

When the recording/reproduction characteristics were evaluated following the same procedures as in Embodiment 1, the half-width PW50 was 8.3 nanoseconds, a favorable value. Also, the value of SNm was 23.1 dB. The medium A-3 was superior in recording resolution and SNm to the medium B-1. In addition, since the value of Hn of the medium A-3 increased, an output reduction by thermal decay was −0.15%/decade in the medium B-1 but improved to −0.13%/decade in the medium A-3.

Embodiment 4

A perpendicular magnetic recording medium A-4 was obtained following the same procedures as in Embodiment 1 except that on a perpendicular magnetic recording layer, a 2-nm thick $PtFe_3$ film having a large magnetostriction constant of $1\times10^{-4}$ and a 2-nm thick $Co_{80}Pt_{20}$ film having anisotropy Hk larger than a saturation magnetic field Hs of the magnetic recording layer were formed in this order in place of the $Sm_{0.5}Dy_{0.5}Fe_2$ high-magnetostriction film.

A pulse magnetic field was applied to the obtained medium A-4 in the radial direction in the same manner as in Embodiment 1, thereby aligning magnetization of the longitudinal hard magnetic film in the radial Also, a medium A-5 was manufactured following the same procedures as for the medium A-4 except that no $Co_{80}Pt_{20}$ film was formed.

After that, a pulse magnetic field was applied to the medium A-5 in the radial direction by using a magnetizing apparatus in the same manner as in Embodiment 1, thereby orienting magnetization of the longitudinal hard magnetic film in the radial direction.

Figure 10:
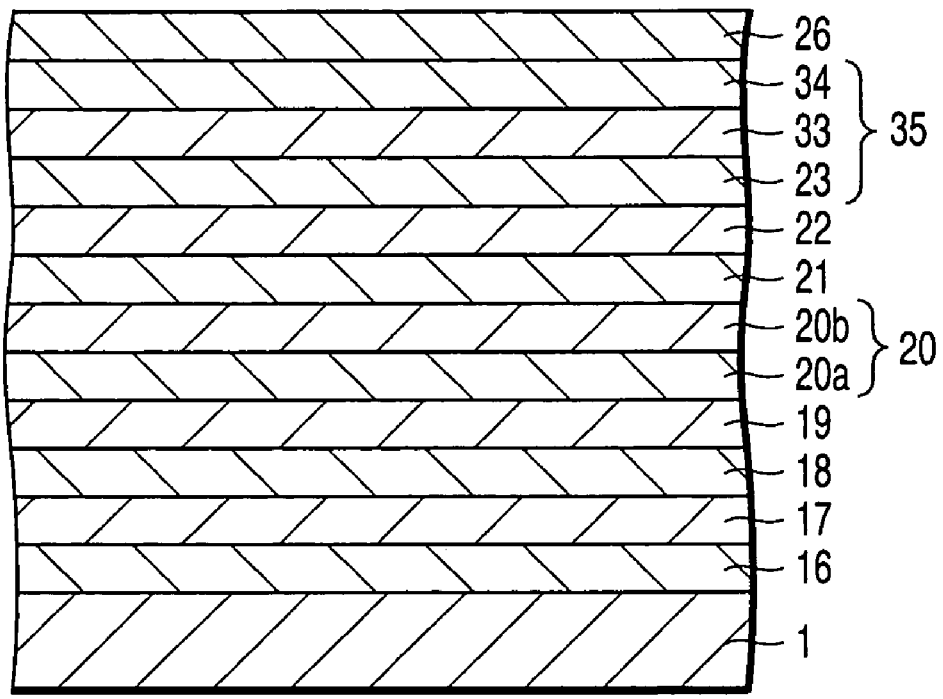
FIG. 10 is a schematic sectional view showing the arrangement of the ninth example of the magnetic recording medium of the present invention.

FIG. 10 is a schematic sectional view showing the arrangement of the medium A-4.

As shown in FIG. 10, the medium A-4 has the same arrangement as the medium A-1 shown in FIG. 7 except that a perpendicular magnetic recording layer 23, high-magnetostriction film 33, and high-Hk film 34 are formed on a second orientation control layer 22, instead of the multi-layer 25 made up of the perpendicular magnetic recording layer 23 and high-magnetostriction film 24.

Figure 11:
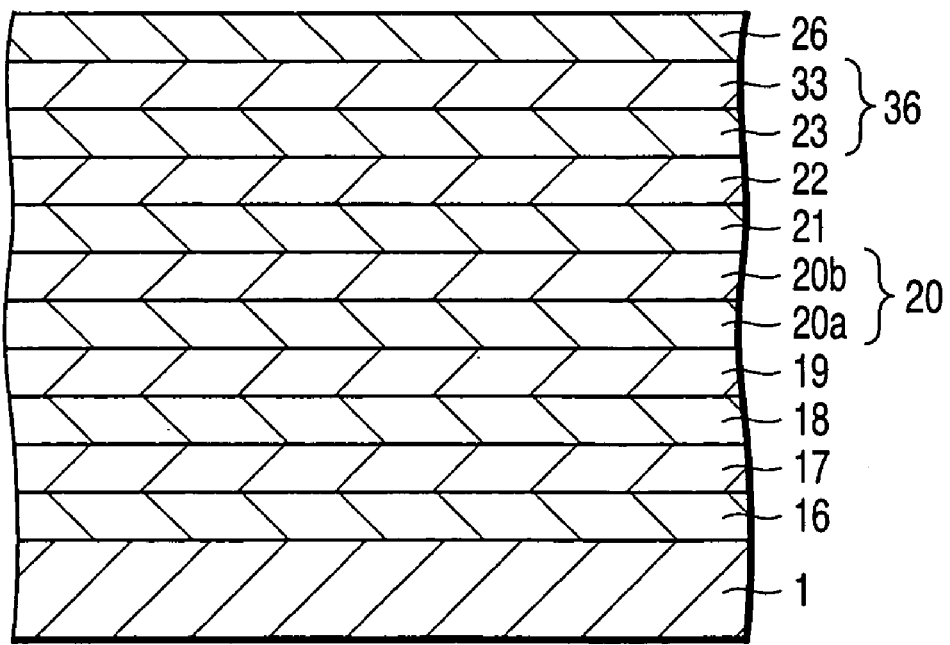
FIG. 11 is a schematic sectional view showing the arrangement of the 10th example of the magnetic recording medium of the present invention.

FIG. 11 is a schematic sectional view showing the arrangement of the medium A-5.

As shown in FIG. 11, the medium A-5 has the same arrangement as the medium A-1 shown in FIG. 7 except that a perpendicular magnetic recording layer 23 and high-magnetostriction film 33 are formed on a second orientation control layer 22, instead of the multi-layer 25 made up of the perpendicular magnetic recording layer 23 and high-magnetostriction film 24.

Kerr effect measurement and electromagnetic conversion characteristic evaluation (recording/reproduction characteristic evaluation) were performed on the obtained media A-4 and A-5 in the same manner as in Embodiment 1. The obtained results are shown in Table 1 (to be presented later).

The magnetic characteristics of the medium A-4 were that the perpendicular coercive force was 284.4 kA/m (3,600 Oe), the squareness ratio Rs was 0.93, and the reverse magnetic domain generating magnetic field Hn was 43.45 kA/m (550 Oe).

When the recording/reproduction characteristics were evaluated following the same procedures as in Embodiment 1, the half-width PW50 was 8.2 nanoseconds, a favorable value. Also, the value of SNm was 23.4 dB.

The characteristics of the medium A-5 were that the perpendicular coercive force was 252.8 kA/m (3,200 Oe), the squareness ratio Rs was 0.90, the reverse magnetic domain generating magnetic field Hn was 27.65 kA/m (350 Oe), the value of SNm was 23.0 dB, and the value of PW50 was 8.7 nanoseconds, which was larger than that of medium A-4 but better than that of the medium B-1.

As described above, the media of the present invention were superior in the recording resolution and SNm. In addition, since the value of Hn of the medium A-4 increased, an output reduction by thermal decay was −0.15%/decade in the medium B-1 but improved to −0.11%/decade in the medium A-4. Likewise, the output reduction of the medium A-5 was −0.13%/decade, better than that of the medium B-1.

Embodiment 5

A perpendicular magnetic recording medium A-6 was obtained following the same procedures as in Embodiment 1 except that instead of the multi-layer made up of the perpendicular magnetic recording layer and high-magnetostriction film, a multi-layer was formed by forming a 12-nm thick Co-19 at % Cr-16 at % Pt-1 at % B film having an easy axis of magnetization in the perpendicular direction as a perpendicular magnetic recording layer, a 2-nm thick $Sm_{0.5}Dy_{0.5}Fe_2$ high-magnetostriction film having a magnetostriction constant of $2\times10^{-4}$ as an interlayer, and an 8-nm thick Co-19 at % Cr-16 at % Pt-1 at % B film in this order.

After that, a pulse magnetic field was applied to the medium A-6 in the radial direction by using a magnetizing apparatus in the same manner as in Embodiment 1, thereby orienting magnetization of the longitudinal hard magnetic film in the radial direction.

Figure 12:
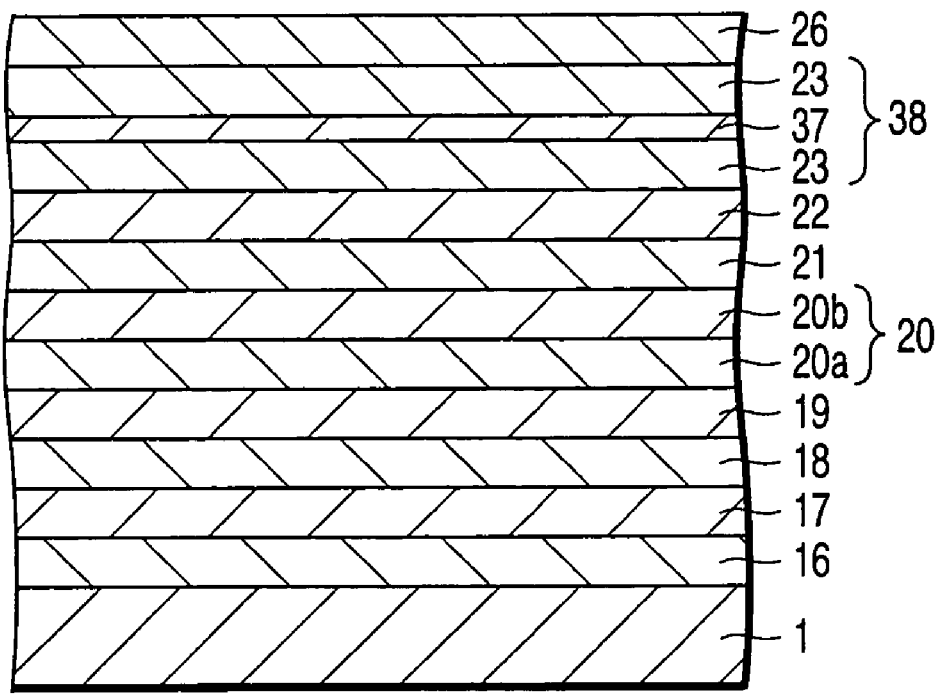
FIG. 12 is a schematic sectional view showing the arrangement of the 11th example of the magnetic recording medium of the present invention.

FIG. 12 is a schematic sectional view showing the arrangement of the medium A-6.

As shown in FIG. 12, the medium A-6 has the same arrangement as the medium A-1 except that a multi-layer 38 made up of a perpendicular magnetic recording layer 23, high-magnetostriction film 37, and perpendicular magnetic recording layer 23 is formed on a second orientation control layer 22, instead of the multi-layer 25.

Kerr effect measurement and electromagnetic conversion characteristic evaluation (recording/reproduction characteristic evaluation) were performed on the obtained medium A-6 in the same manner as in Embodiment 1. The obtained results are shown in Table 1 (to be presented later).

The magnetic characteristics of the medium A-6 were that the perpendicular coercive force was 272.55 kA/m (3,450 Oe), the squareness ratio Rs was 0.91, and the reverse magnetic domain generating magnetic field Hn was 31.6 kA/m (400 Oe). As is apparent from the relationship between the perpendicular Hc and Hn, the slope of the MH loop of the medium A-6 was steep, indicating high recording resolution.

When the recording/reproduction characteristics of this medium were evaluated following the same procedures as in Embodiment 1, the half-width PW50 was 8.3 nanoseconds, a favorable value. Also, the value of SNm was 23.5 dB.

As described above, the medium A-6 was superior in the recording resolution and SNm to the medium B-1. In addition, since the value of Hn of the medium A-6 increased, an output reduction by thermal decay improved to −0.12%/decade compared to the medium B-1.

Embodiment 6

A perpendicular magnetic recording medium A-7 was obtained following the same procedures as in Embodiment 1 except that a 5-nm thick Ti film and 5-nm thick Ru film were formed instead of the Ni-40 at % Ta orientation control layer and Co-26 at % Cr-12 at % Pt-4 at % B underlayer, a 20-nm thick CoPtCrO film was formed as a perpendicular magnetic recording layer on the Ti and Ru films by performing sputtering in an Ar ambient containing oxygen by using a Co-20 at % Pt-16 at % Cr target, and a 4-nm thick $Tb_{0.5}Dy_{0.5}Fe_2$ high-magnetostriction film having a magnetostriction constant of $4\times10^{-4}$ was formed as a high-magnetostriction film on the perpendicular magnetic recording layer.

After that, a pulse magnetic field was applied to the medium A-7 in the radial direction by using a magnetizing apparatus in the same manner as in Embodiment 1, thereby orienting magnetization of the longitudinal hard magnetic film in the radial direction.

Figure 13:
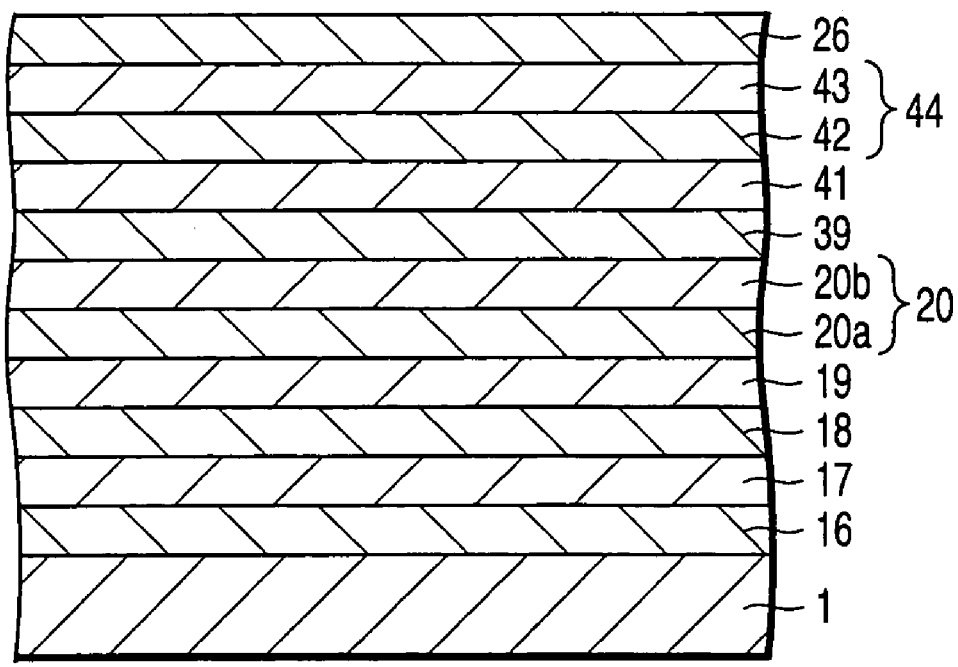
FIG. 13 is a schematic sectional view showing the arrangement of the 12th example of the magnetic recording medium of the present invention.

FIG. 13 is a schematic sectional view showing the arrangement of the medium A-7.

As shown in FIG. 13, the medium A-7 has the same arrangement as Embodiment 1 except that orientation control layers 39 and 41 are formed instead of the first and second orientation control layers 21 and 22, and a multi-layer 44 made up of a perpendicular magnetic recording layer 42 containing oxygen and high-magnetostriction film 43 is formed instead of the multi-layer 25.

For comparison, a conventional perpendicular magnetic recording medium B-3 was formed following the same procedures as for the medium A-7 except that no $Tb_{0.5}Dy_{0.5}Fe_2$ high-magnetostriction film was formed.

Kerr effect measurement and electromagnetic conversion characteristic evaluation (recording/reproduction characteristic evaluation) were performed on the obtained media A-7 and B-3.

The obtained results are shown in Table 3 (to be presented later).

The magnetic characteristics of the medium A-7 were that the perpendicular coercive force was 331.8 kA/m (4,200 Oe), the squareness ratio Rs was 0.94, and the reverse magnetic domain generating magnetic field Hn was 67.15 kA/m (850 Oe). As is apparent from the relationship between Hc and Hn, the slope of the MH loop of the medium was steep, indicating high recording resolution.

When the recording/reproduction characteristics were evaluated following the same procedures as in Embodiment 1, the half-width PW50 was 7.8 nanoseconds, a favorable value. Also, the value of SNm at a recording density of 500 kFCI was 23.3 dB.

On the other hand, the characteristics of the conventional medium B-3 were that the perpendicular Hc was 355.5 kA/m (4,500 Oe), the squareness ratio Rs was 0.94, the reverse magnetic domain generating magnetic field Hn was 47.4 kA/m (600 Oe), the value of PW50 was 8.3 nanoseconds, and the value of SNm was 22.4 dB.

As described above, the medium A-7 was superior in the recording resolution and SNm to the medium B-3. In addition, since the value of Hn of the medium A-7 was larger than that of the medium B-3, an output reduction by thermal decay improved to −0.10%/decade while that of the medium B-3 was −0.12%/decade.

TABLE 1

| Medium | Hc (kA/m) | Rs | Hn (kA/m) | PW50 (nsec) | SNm (dB) | Output reduction (%/decade) |
|---|---|---|---|---|---|---|
| A-1 | 280.45 | 0.92 | 63.2 | 8.2 | 23.2 | −0.12 |
| A-3 | 284.4 | 0.91 | 47.4 | 8.3 | 23.1 | −0.13 |
| A-4 | 284.4 | 0.93 | 71.1 | 8.2 | 23.4 | −0.11 |
| A-5 | 252.8 | 0.90 | 27.65 | 8.7 | 23.0 | −0.13 |
| A-6 | 272.55 | 0.91 | 39.5 | 8.3 | 23.5 | −0.12 |
| B-1 | 276.5 | 0.90 | 23.7 | 9.1 | 22.6 | −0.15 |

TABLE 2

| Medium | Hc (kA/m) | S | S* | PW50 (nsec) | SNm (dB) |
|---|---|---|---|---|---|
| A-2 | 355.5 | 0.86 | 0.82 | 8.6 | 23.1 |
| B-2 | 379.2 | 0.84 | 0.78 | 9.2 | 22.6 |

TABLE 3

| Medium | Hc (kA/m) | Rs | Hn (kA/m) | PW50 (nsec) | SNm (dB) | Output reduction (%/decade) |
|---|---|---|---|---|---|---|
| A-7 | 331.8 | 0.94 | 67.15 | 7.8 | 23.2 | −0.10 |
| B-3 | 355.5 | 0.94 | 47.4 | 8.3 | 22.4 | −0.12 |

In the present invention as described above, the coercive force dispersion of a magnetic recording medium is substantially decreased. This makes it possible to increase the recording resolution by decreasing the magnetization transition width, increase the medium S/N ratio by decreasing the magnetization transition length of the magnetic recording medium and making its anisotropic magnetic field Hk uniform, ensure a high thermal decay resistance, and record and reproduce high-density information.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A magnetic recording medium comprising:
    a multi-layer on a substrate, the multi-layer including:
        a magnetic recording layer, and
        a high-magnetostriction layer having magnetostriction larger than that of the magnetic recording layer,
        wherein the high-magnetostriction layer has a magnetostriction constant larger than $5 \times 10^{-5}$, and
    wherein a saturation magnetic field of the high-magnetostriction layer is larger than that of the magnetic recording layer.

2. A medium according to claim 1, wherein the magnetic recording layer is a perpendicular magnetic recording layer having perpendicular magnetic anisotropy.

3. A medium according to claim 2, further comprising a soft magnetic layer between the substrate and the multi-layer, wherein the multi-layer further includes, on a substrate side thereof, a low-elasticity layer having a Young's modulus lower than that of the soft magnetic layer.

4. A medium according to claim 1, wherein the high-magnetostriction layer includes a combination of a high-magnetostriction film and a high-saturation-magnetic-filed film having a saturation magnetic field larger than that of the magnetic recording layer.

5. A medium according to claim 1, wherein the high-magnetostriction layer includes at least one member selected from the group consisting of $RFe_2$ (R is a rare earth element), $TbFe_2$, $ErFe_2$, $Sm_xDy_{1-x}Fe_2$, $Tb_xDy_{1-x}Fe_2$, an Fe/Pt stacked film, and a Co/Pd stacked film.

6. A medium according to claim 1, wherein the magnetic recording layer contains at least one of cobalt and iron, at least one of platinum and palladium, and at least one of chromium and oxygen.

7. A magnetic recording/reproducing apparatus comprising:
    a recording medium which comprises, on a substrate, a multi-layer that includes:
    a magnetic recording layer, and
    a high-magnetostriction layer having magnetostriction larger than that of the magnetic recording layer, and a recording/reproducing head,
    wherein the high-magnetostriction layer has a magnetostriction constant larger than $5 \times 10_{-5}$, and
    wherein a saturation magnetic field of the high-magnetostriction layer is larger than that of the magnetic recording layer.

8. An apparatus according to claim 7, wherein the recording/reproducing head is a single pole recording head.

9. An apparatus according to claim 7, wherein the magnetic recording layer is a perpendicular magnetic recording layer having perpendicular magnetic anisotropy.

10. An apparatus according to claim 9, further comprising a soft magnetic layer between the substrate and the multi-layer, wherein the multi-layer further includes, on a substrate side thereof, a low-elasticity layer having a Young's modulus lower than that of the soft magnetic layer.

11. An apparatus according to claim 7, wherein the high-magnetostriction layer includes a combination of a high-magnetostriction film and a high-saturation-magnetic-field film having a saturation magnetic filed larger than that of the magnetic recording layer.

12. An apparatus according to claim 7, wherein the high magnetostriction layer includes at least one member selected from the group consisting of $RFe_2$ (R is a rare earth element), $TbFe_2$, $ErFe_2$, $Sm_xDy_{1-x}Fe_2$, $Tb_xDy_{1-x}Fe_2$, an Fe/Pt stacked film, and a Co/Pd stacked film.

13. An apparatus according to claim 7, wherein the magnetic recording layer contains at least one of cobalt and iron, at least one of platinum and palladium, and at least one of chromium and oxygen.

14. A magnetic recording medium comprising:
    a multi-layer on a substrate, the multi-layer including:
        a magnetic recording layer, and
        a high-magnetostriction layer having magnetostriction larger than that of the magnetic recording layer, wherein the high-magnetostriction layer includes a combination of a high-magnetostriction film and a high-saturation-magnetic-filed film having a saturation magnetic field larger than that of the magnetic recording layer.

15. A magnetic recording/reproducing apparatus, comprising:
a recording medium which comprises, on a substrate, a multi-layer that includes:
a magnetic recording layer, and
a high-magnetostriction layer having magnetostriction larger than that of the magnetic recording layer, and a recording/reproducing head,
wherein the high-magnetostriction layer includes a combination of a high-magnetostriction film and a high-saturation-magnetic-field film having a saturation magnetic filed larger than that of the magnetic recording layer.

* * * * *